US012620807B2

(12) United States Patent
Zhou et al.

(10) Patent No.: US 12,620,807 B2
(45) Date of Patent: May 5, 2026

(54) COORDINATED OPTIMIZATION PEAK SHAVING METHOD FOR PLURALITY OF POWER SUPPLIES BASED ON FLUCTUATION CHARACTERISTICS OF RENEWABLE ENERGY

(71) Applicants: STATE GRID GANSU ELECTRIC POWER RESEARCH INSTITUTE, Lanzhou (CN); STATE GRID GANSU ELECTRIC POWER COMPANY, Lanzhou (CN); State Grid Qinghai Electric Power Research Institute, Xining (CN); State Grid Qinghai Electric Power Company, Xining (CN); State Grid Corporation of China, Beijing (CN)

(72) Inventors: Qiang Zhou, Lanzhou (CN); Yanqi Zhang, Lanzhou (CN); Pengfei Gao, Lanzhou (CN); Kun Ding, Lanzhou (CN); Qingquan Lv, Lanzhou (CN); Long Zhao, Lanzhou (CN); Ruixiao Zhang, Lanzhou (CN); Yanhong Ma, Lanzhou (CN); Guodong Wu, Lanzhou (CN); Chengjia Bao, Lanzhou (CN); Jinping Zhang, Lanzhou (CN); Dingmei Wang, Lanzhou (CN); Jianmei Zhang, Lanzhou (CN); Jin Li, Lanzhou (CN); Zhenzhen Zhang, Lanzhou (CN); Sheng Wang, Lanzhou (CN); Yongrui Zhang, Lanzhou (CN)

(73) Assignees: STATE GRID GANSU ELECTRIC POWER RESEARCH INSTITUTE, Lanzhou (CN); STATE GRID GANSU ELECTRIC POWER COMPANY, Lanzhou (CN); State Grid Qinghai Electric Power Research Institute, Xining (CN); State Grid Qinghai Electric Power Company, Xining (CN); State Grid Corporation of China, Beijing (CN)

( * ) Notice: Subject to any disclaimer, the term of this patent is extended or adjusted under 35 U.S.C. 154(b) by 481 days.

(21) Appl. No.: 18/018,577

(22) PCT Filed: Jun. 10, 2021

(86) PCT No.: PCT/CN2021/099358
§ 371 (c)(1),
(2) Date: Jan. 29, 2023

(87) PCT Pub. No.: WO2022/022099
PCT Pub. Date: Feb. 3, 2022

(65) Prior Publication Data
US 2023/0299585 A1 Sep. 21, 2023

(30) Foreign Application Priority Data
Jul. 29, 2020 (CN) .......................... 202010746537.8

(51) Int. Cl.
*H02J 3/14* (2006.01)
*H02J 3/00* (2006.01)
*H02J 3/38* (2006.01)

(52) U.S. Cl.
CPC .............. *H02J 3/144* (2020.01); *H02J 3/003* (2020.01); *H02J 3/004* (2020.01); *H02J 3/381* (2013.01);
(Continued)

(58) Field of Classification Search
CPC .. H02J 3/144; H02J 3/003; H02J 3/004; H02J 3/381; H02J 2203/10; H02J 2203/20;
(Continued)

(56) References Cited

U.S. PATENT DOCUMENTS

| | | | | |
|---|---|---|---|---|
| 2011/0066258 A1* | 3/2011 | Torzhkov | ............... | G05B 17/02 |
| | | | | 700/29 |
| 2012/0191426 A1* | 7/2012 | Kalich | ................... | G06Q 50/06 |
| | | | | 703/2 |

(Continued)

FOREIGN PATENT DOCUMENTS

| | | |
|---|---|---|
| CN | 108574303 A | 9/2018 |
| CN | 109167383 A | 1/2019 |
| CN | 112311018 A | 2/2021 |

OTHER PUBLICATIONS

International Search Report of PCT Patent Application No. PCT/CN2021/099358 issued on Aug. 31, 2021.

*Primary Examiner* — Ziaul Karim

(57) ABSTRACT

Disclosed is a coordinated peak shaving optimization method for a plurality of power supplies based on a fluc- (Continued)

tuation characteristic of a renewable energy source, including the following steps: s1: determining a weekly generated electricity quantity of hydropower based on an available capacity and a storage capacity of an electricity quantity; s2: predicting a renewable energy power generation curve and a load curve of a system weekly; s3: determining a start point of peak shaving of the hydropower based on an external transmission curve, the renewable energy generation curve, and the load curve of the system and a generating capacity of the hydropower; s4: determining a weekly peak shaving demand of the system; and s5: establishing an optimization model with a maximum peak shaving demand. The present disclosure proposes a reasonable arrangement for peak shaving, so as to resolve an accommodation problem caused by large-scale access of a renewable energy source.

5 Claims, 1 Drawing Sheet

(52) U.S. Cl.
CPC ....... *H02J 2203/10* (2020.01); *H02J 2203/20* (2020.01); *H02J 2300/20* (2020.01); *H02J 2310/60* (2020.01)

(58) Field of Classification Search
CPC .... H02J 2300/20; H02J 2310/60; H02J 3/466; H02J 3/24; H02J 2300/28; Y02E 40/70; Y04S 10/50; G06Q 10/04; G06Q 10/06312; G06Q 10/06315; G06Q 50/06
See application file for complete search history.

(56) References Cited

U.S. PATENT DOCUMENTS

| 2016/0092622 | A1* | 3/2016 | Wang | H02J 3/004 |
| | | | | 703/2 |
| 2016/0190805 | A1* | 6/2016 | Steven | G06Q 50/06 |
| | | | | 700/291 |
| 2019/0187637 | A1* | 6/2019 | Shen | G06Q 10/04 |
| 2020/0090285 | A1* | 3/2020 | Shen | G05B 13/0265 |

* cited by examiner

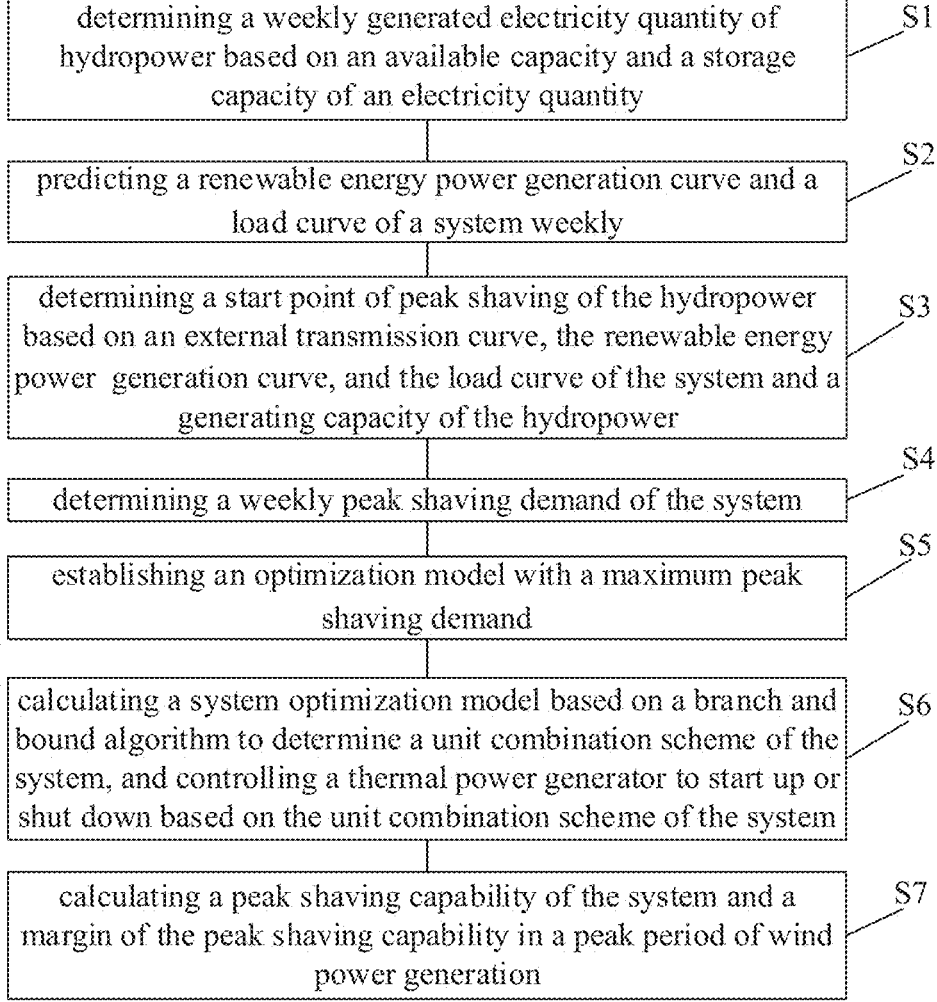

determining a weekly generated electricity quantity of hydropower based on an available capacity and a storage capacity of an electricity quantity — S1 predicting a renewable energy power generation curve and a load curve of a system weekly — S2 determining a start point of peak shaving of the hydropower based on an external transmission curve, the renewable energy power generation curve, and the load curve of the system and a generating capacity of the hydropower — S3 determining a weekly peak shaving demand of the system — S4 establishing an optimization model with a maximum peak shaving demand — S5 calculating a system optimization model based on a branch and bound algorithm to determine a unit combination scheme of the system, and controlling a thermal power generator to start up or shut down based on the unit combination scheme of the system — S6 calculating a peak shaving capability of the system and a margin of the peak shaving capability in a peak period of wind power generation — S7

COORDINATED OPTIMIZATION PEAK SHAVING METHOD FOR PLURALITY OF POWER SUPPLIES BASED ON FLUCTUATION CHARACTERISTICS OF RENEWABLE ENERGY

TECHNICAL FIELD

The present disclosure relates to a peak shaving optimization method, and in particular, to a coordinated optimization peak shaving method for a plurality of power supplies based on fluctuation characteristics of renewable energy, and belongs to the technical field of electrical engineering.

BACKGROUND

Large-scale access of a renewable energy source will bring great difficulties to dispatching of a power grid. Although centralized transmission of electric energy can alleviate peak shaving pressure of a local unit to a certain extent, an external transmission curve generally shows a similar characteristic to a load curve, and a power output of a renewable energy source will drop from a maximum power output to zero or rise from zero to a maximum power output within a day. These two factors make a local regional power grid still face an arduous peak shaving task after large-scale access of the renewable energy source to the local regional power grid. Therefore, in order to maximize accommodation of the renewable energy source while tracking a given external transmission curve, it is necessary to reasonably regulate a unit in the regional power grid.

The present disclosure comprehensively considers various power supplies in the regional power grid, proposes a weekly coordinated peak shaving strategy of the power supplies, and establishes a unit combination optimization model for a thermal power generator to meet a peak shaving demand under a penetration rate of a high and renewable energy, so as to meet a requirement for safe system operation while tracking the external transmission curve and maximizing the accommodation of the renewable energy.

SUMMARY

The present disclosure is intended to provide a coordinated optimization peak shaving method for a plurality of power supplies based on fluctuation characteristics of renewable energy, so as to resolve the problems described in the background.

To achieve the above objective, the present disclosure provides the following technical solutions: A coordinated optimization peak shaving method for a plurality of power supplies based on fluctuation characteristics of renewable energy includes the following steps:

s1: determining a weekly generated electricity quantity of hydropower based on an available capacity and a storage capacity of an electricity quantity;

s2: predicting a renewable energy power generation curve and a load curve of a system weekly;

s3: determining a start point of peak shaving of the hydropower based on an external transmission curve, the renewable energy power generation curve, and the load curve of the system and a generating capacity of the hydropower;

s4: determining a weekly peak shaving demand of the system;

s5: establishing an optimization model with a maximum peak shaving demand;

s6: calculating a system optimization model based on a branch and bound algorithm, and determining a unit combination scheme of the system; and s7: calculating a peak shaving capability of the system and a margin of the peak shaving capability in a peak period of wind power generation.

As a preferred technical solution of the present disclosure, the determining a start point of peak shaving of the hydropower in step s3 includes:

a1: determining a basic operating power $P_B$ of the hydropower, and determining, based on a capacity limit of a reservoir, that a limit of a planned weekly electricity quantity generated $[E_{min}\ E_{max}]$, where a difference between $E_{min}$ and $E_{max}$ is controlled to be between 2% and 5%; when the $P_B$ is calculated, a generated electricity quantity of the hydropower is calculated according to a formula $$E_H = (E_{min} + E_{max})/2; \tag{1}$$

a weekly load curve in a regional power grid is denoted as $P_l(t)$, an external transmission power curve is denoted as $P_T(t)$, renewable energy power generation is denoted as $P_R(t)$; and in this case, an equivalent load of the system is:

$$P_l^E(t) = P_l(t) + P_T(t) - P_R(t), \tag{2}$$

the generated electricity quantity of the hydropower meets:

$$\int_0^T [P_l^E(t) - P_B]dt = E_H, \tag{3}$$

and a following constraint is met:

$$\max\{P_l^E(t)\} - P_B \le R_H^{max}; \tag{4}$$

a2: performing initialization based on historical data and operating experience to make $$P_B = P_B^0,$$

and setting an error parameter $\varepsilon$;

a3: testing whether an inequality $$\max\{P_l^E(t)\} - P_B \le R_H^{max} \tag{4}$$

holds true, and if the inequality does not hold true, increasing $P_B$ until the inequality holds true;

a4: calculating an integral $$\int_0^T [P_l^E(t) - P_B]dt$$

3 according to a formula $$\int_0^T \left[ P_I^E(t) - P_B \right] dt = E_H; \text{ and if} \tag{3}$$

$$\left| \int_0^T \left[ P_I^E(t) - P_B \right] dt - E_H \right| > \varepsilon, \text{ and} \tag{5}$$

$$\int_0^T \left[ P_I^E(t) - P_B \right] dt > E_H, \tag{6}$$

setting $P_B = P_B - \Delta P$ (7), and on the contrary, setting $P_B = P_B + \Delta P$ (8); and a5: repeating step a4 until $$\left| \int_0^T \left[ P_I^E(t) - P_B \right] dt - E_H \right| \leq \varepsilon, \tag{9}$$

and recording a current value of $P_B$.

As a preferred technical solution of the present disclosure, an equation condition of an active power balance satisfied by active power outputs, loads, and active power losses of all generators in a power grid at any time for the peak shaving demand in step s4 is as follows:

$$\sum_{i=1}^{n} P_{Gi} - \sum_{i=1}^{m} P_{Li} - \Delta P_\Sigma = 0 \tag{10}$$

where when a startup mode of thermal power is determined, in order to ensure a maximum power output of the thermal power and reliable power supply of a load when the hydropower is not started, a power $P_B$ of the start point of the peak shaving of the hydropower is used to replace a total equivalent load $$\sum_{i=1}^{m} P_{Li},$$

where i represents a total quantity of generators, m represents a total quantity of loads, and $P_{Li}$ represents an active power of an $i^{th}$ load, $$\sum_{i=1}^{n} P_{Gi}$$

represents a sum of power outputs of all the generators in the power grid, and a power output $P_{Gi}$ of each generator meets upper and lower limit constraints shown in an equation (11):

$$P_{Gi}^{min} \leq P_{Gi} \leq P_{Gi}^{max} \tag{11}$$

where $\Delta P_\Sigma$ represents an active power loss of the power grid; and

4

$$P_{Gi}^{min}$$

and $$P_{Gi}^{max}$$

respectively represent lower and upper limits of a power output of an $i^{th}$ generator;

when an equivalent load of the system is reduced from $P_B$ to $P_{min}$ in a peak period of renewable energy power generation, the active power balance is written as follows:

$$\sum_{i=1}^{n} P_{Gi}' - (P_B - \Delta P_L) - \Delta P_\Sigma = 0 \tag{12}$$

where $\Delta P_L$ represents a variable of the equivalent load, which is a positive value; and $P_{Gi}'$ represents a changed power of the $i^{th}$ generator;

a following formula is obtained by subtracting the equation (10) from an equation (12):

$$\sum_{i=1}^{n} P_{Gi}' - \sum_{i=1}^{n} P_{Gi} = -\Delta P_L = -R_c; \tag{13}$$

and in this case, $\Delta P_L$ represents the variable of the equivalent load, and $-\Delta P_L$ is always a negative value; $-R_c$ is defined as a negative peak shaving capacity of a conventional generator; and in the formula (13), a negative peak shaving capability of the conventional generator is a capability of the conventional generator in reducing an active power output when an equivalent active load in the power grid decreases from the $P_B$ to the $P_{min}$, where the negative peak shaving capacity is equal to a difference between an output after adjustment and an output before the adjustment, which is always negative.

As a preferred technical solution of the present disclosure, the establishing an optimization model with a maximum peak shaving demand in step s5 includes the following steps:

b1: setting a maximum negative peak shaving capacity of a thermal power generator, where the maximum negative peak shaving capacity of the thermal power generator depends on a given lower limit parameter $$\sum_{i=1}^{n\Sigma} P_{Gimin}'$$

of a power output of a generator combination; and in a power grid, there are a plurality of generator combinations meeting a given load requirement, and different generator combinations have different output lower limits;

b2: finding, through optimization, a minimum value of the $$\sum_{i=1}^{n\Sigma} P'_{Gimin}$$

meeting a load demand, so as to provide a negative peak shaving capacity and increase an accommodation proportion of a renewable energy source;

b3: determining that there are N generators participating in the peak shaving in a regional power grid, and a power output of an $i^{th}$ generator is $P_{Gi}$ whose value range is defined as $[P_{G\ min}\ P_{G\ max}]$, where $P_{G\ min}$ represents a lower limit of the power output of the $i^{th}$ generator, and $P_{G\ max}$ represents an upper limit of the power output of the $i^{th}$ generator; defining an N-dimensional vector to represent a generator combination, namely, $C=[c_1, c_2, \ldots c_i, \ldots c_n]$, where $c_i$ represents a state of the $i^{th}$ generator, and the corresponding generator does not participate in power generation when the state of the $i^{th}$ generator is 0, or has provided a certain power output to the power grid when the state of the $i^{th}$ generator is 1; defining a vector $P_{G\ min}=[P_{G1\ min}, \ldots P_{Gi\ min}, \ldots P_{Gn\ min}]$ and a vector $P_{G\ max}=[P_{G1\ max}, \ldots P_{Gi\ max}, \ldots P_{Gn\ max}]$, and then obtaining $$R_c^{max}(C) = P_B + \Delta P_\Sigma - C^T P_{G\ min}; \tag{14}$$

and using $\Omega$ to represent a value space of C, where in this space, a quantity of states of the generator combination is $2^{n-1}$, and a purpose of the generator combination is to search for the generator state vector C in the state space $\Omega$ to maximize a peak shaving capacity, so a corresponding objective function is written as a formula $$\max R_c^{max}(C) = P_B + \Delta P_\Sigma - C^T P_{G\ min}; \tag{15}$$

b4: performing summarization according to step b3 to obtain $$\begin{cases} C^T P_{Gmin} \le P_B + \Delta P_\Sigma \le C^T P_{Gmax} & (a) \\ P_{Gmin} \le P_{Gi} \le P_{Gmax} & (b); \\ c_i \in [0, 1] & (c) \end{cases} \tag{16}$$

b5: the equivalent load changes within a range of $L=[P_{min}\ P_B]$ when the start point $P_B$ of the peak shaving of the hydropower is met, and when the equivalent load of the system continues to decrease, a limit of the negative peak shaving capacity of the system continues to decrease, for ensuring adequacy of a system capacity in the case of a minimum load, namely, $$P_{min} - C^T P_{G\ min} \ge R_{th}, \tag{17}$$

where $R_{th}$ represents a minimum peak shaving demand based on a load and a renewable energy prediction error; and b6: obtaining a final optimization model of a thermal power generator combination based on the peak shaving of the hydropower, namely, $$\begin{cases} \max R_c^{max}(C) = P'_B - C^T P_{Gmin} & (a) \\ \quad\quad\quad s.t. \\ C^T P_{Gmin} \le P_B + \Delta P_\Sigma \le C^T P_{Gmax} & (b) \\ P_{Gmin} \le P_{Gi} \le P_{Gmax} & (c) \\ P_{min} - C^T P_{Gmin} \ge R_{th} & (d) \\ c_i \in [0, 1] & (e) \end{cases} \tag{18}$$

As a preferred technical solution of the present disclosure, the branch and bound algorithm in step s6 is as follows:

C1: placing on original problem P0 into a to-be-resolved problem set L, and setting a target value $z^*=\infty$ and a solution variable $x^*=\varnothing$;

C2: determining whether the L is null, where if the L is null, the current operation is stopped; or if the L is not null, ILP(k) is selected from the L according to a certain policy, and the ILP(k) is deleted from the L;

C3: solving a linear relaxation problem LP(k) of the ILP(k), where if the LP(k) has no feasible solution, step C2 is performed; otherwise, ZIP is set to represent an objective function value of the LP(k), where $x_{LR_k}$ represents the corresponding solution of the LP(k); and C4: if, performing step C2, where if $x_{LP_k}$ does not meet an integer constraint, step C3 is performed; otherwise, $z^*=z_{LP_k}$ and $x^*=x_{LP_k}$ are set, and step C2 is performed.

Compared with the prior art, the present disclosure achieves following beneficial effects:

The present disclosure provides a coordinated optimization peak shaving method for a plurality of power supplies based on fluctuation characteristics of renewable energy, so as to propose a reasonable arrangement for peak shaving to resolve an accommodation problem caused by large-scale access of renewable energy. Further, in order to meet a peak shaving demand for accommodating the renewable energy, an optimization model of a startup and shutdown combination of a thermal power generator is proposed to meet a peak shaving demand of a system. A weekly startup mode of the thermal power generator can be determined by solving and establishing the model, which can ensure a peak shaving capability of the system while avoiding frequent startup and shutdown of the thermal power generator.

BRIEF DESCRIPTION OF THE DRAWINGS

FIG. 1 is a schematic flowchart of a coordinated optimization peak shaving method for a plurality of power supplies based on fluctuation characteristics of renewable energy.

DETAILED DESCRIPTION

The following clearly and completely describes the technical solutions in the embodiments of the present disclosure with reference to the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

As shown in FIG. 1, the present disclosure provides a coordinated optimization peak shaving method for a plurality of power supplies based on fluctuation characteristics of renewable energy.

The coordinated optimization peak shaving method includes the following steps:

s1: Determine a weekly generated electricity quantity of hydropower based on an available capacity and a storage capacity of an electricity quantity.

s2: Predict a renewable energy power generation curve and a load curve of a system weekly.

s3: Determine a start point of peak shaving of the hydropower based on an external transmission curve, the renewable energy power generation curve, and the load curve of the system and a generating capacity of the hydropower.

s4: Determine a weekly peak shaving demand of the system.

s5: Establish an optimization model with a maximum peak shaving demand.

s6: Calculate a system optimization model based on a branch and bound algorithm, and determine a unit combination scheme of the system.

s7: Calculate a peak shaving capability of the system and a margin of the peak shaving capability in a peak period of wind power generation.

The determining a start point of peak shaving of the hydropower in step s3 includes the following steps:

a1: Determine a basic operating power $P_B$ of the hydropower, and determine, based on a capacity limit of a reservoir, that a limit of a planned weekly electricity quantity generated is $[E_{min}\ E_{max}]$, where a difference between $E_{min}$ and $E_{max}$ is controlled to be between 2% and 5%; when the $P_B$ is calculated, a generated electricity quantity of the hydropower is calculated according to a formula $E_H=(E_{min}+E_{max})/2$ (1); a weekly load curve in a regional power grid is denoted as $P_l(t)$, an external transmission power curve is denoted as $P_T(t)$, renewable energy power generation is denoted as $P_R(t)$; and in this case, an equivalent load of the system is:

$$P_l^E(t) = P_l(t) + P_T(t) - P_R(t), \tag{2}$$

the generated electricity quantity of the hydropower meets:

$$\int_0^T [P_l^E(t) - P_B]dt = E_H, \tag{3}$$

and a following constraint is met:

$$\max\{P_l^E(t)\} - P_B \le R_H^{max}; \tag{4}$$

a2: Perform initialization based on historical data and operating experience to make $$P_B = P_B^0,$$

and set an error parameter $\varepsilon$;

a3: Test whether an inequality $$\max\{P_l^E(t)\} - P_B \le R_H^{max} \tag{4}$$

holds true, and if the inequality does not hold true, increase $P_B$ until the inequality holds true.

a4: Calculate an integral $$\int_0^T [P_l^E(t) - P_B]dt$$

according to a formula $$\int_0^T [P_l^E(t) - P_B]dt = E_H; \text{ and if} \tag{3}$$

$$\left| \int_0^T [P_l^E(t) - P_B]dt - E_H \right| > \varepsilon, \text{ and} \tag{5}$$

$$\int_0^T [P_l^E(t) - P_B]dt > E_H, \tag{6}$$

set $P_B=P_B-\Delta P$ (7), and on the contrary, set $P_B=P_B+\Delta P$ (8).

a5: Repeat step a4 until $$\left| \int_0^T [P_l^E(t) - P_B]dt - E_H \right| \le \varepsilon, \tag{9}$$

and record a current value of $P_B$.

An equation condition of an active power balance satisfied by active power outputs, loads, and active power losses of all generators in a power grid at any time for the peak shaving demand in step s4 is as follows:

$$\sum_{i=1}^n P_{Gi} - \sum_{i=1}^m P_{Li} - \Delta P_\Sigma = 0 \tag{10}$$

where when a startup mode of thermal power is determined, in order to ensure a maximum power output of the thermal power and reliable power supply of a load when the hydropower is not started, a power $P_B$ of the start point of the peak shaving of the hydropower is used to replace a total equivalent load $$\sum_{i=1}^m P_{Li},$$

where i represents a total quantity of generators, m represents a total quantity of loads, and $P_{Li}$ represents an active power of an $i^{th}$ load, $$\sum_{i=1}^n P_{Gi}$$

represents a sum of power outputs of all the generators in the power grid, and a power output $P_{Gi}$ of each generator must meet upper and lower limit constraints shown in an equation (11):

$$P_{Gi}^{min} \le P_{Gi} \le P_{Gi}^{max} \qquad (11)$$

where $\Delta P_{\Sigma}$ represents an active power loss of the power grid;

$$P_{Gi}^{min}$$

and $$P_{Gi}^{max}$$

respectively represent lower and upper limits of a power output of an $i^{th}$ generator;

when an equivalent load of the system is reduced from $P_B$ to $P_{min}$ in a peak period of renewable energy power generation, the active power balance is written as follows:

$$\sum_{i=1}^{n} P'_{Gi} - (P_B - \Delta P_L) - \Delta P_{\Sigma} = 0 \qquad (12)$$

where $\Delta P_L$ represents a variable of the equivalent load, which is a positive value; $P_B$ represents the power of the start point of the peak shaving of the hydropower, in other words, the basic operating power of the hydropower; and $P_{Gi}'$ represents a changed power of the $i^{th}$ generator;

a following formula is obtained by subtracting the equation (10) from an equation (12):

$$\sum_{i=1}^{n} P'_{Gi} - \sum_{i=1}^{n} P_{Gi} = -\Delta P_L = -R_c; \qquad (13)$$

and in this case, $\Delta P_L$ represents the variable of the equivalent load, and $-\Delta P_L$ is always a negative value; $-R_c$ is defined as a negative peak shaving capacity of a conventional generator; and in the formula (13), a negative peak shaving capability of the conventional generator is a capability of the conventional generator in reducing an active power output when an equivalent active load in the power grid decreases from the $P_B$ to the $P_{min}$, where the negative peak shaving capacity is equal to a difference between an output after adjustment and an output before the adjustment, which is always negative.

The establishing an optimization model with a maximum peak shaving demand in step s5 includes the following steps:

b1: Set a maximum negative peak shaving capacity of a thermal power generator, where the maximum negative peak shaving capacity of the thermal power generator depends on a given lower limit parameter $$\sum_{i=1}^{n\Sigma} P'_{Gimin}$$

of a power output of a generator combination; and in a power grid, there are a plurality of generator combinations meeting a given load requirement, and different generator combinations have different output lower limits.

b2: Find, through optimization, a minimum value of the $$\sum_{i=1}^{n\Sigma} P'_{Gimin}$$

meeting a load demand, so as to provide a negative peak shaving capacity and increase an accommodation proportion of a renewable energy source.

b3: Determine that there are N generators participating in the peak shaving in a regional power grid, and the power output of the $i^{th}$ generator is $P_{Gi}$ whose value range is defined as $[P_{G\ min}\ P_{G\ max}]$ where $P_{G\ min}$ represents the lower limit of the power output of the $i^{th}$ generator, and $P_{G\ max}$ represents the upper limit of the power output of the $i^{th}$ generator; define an N-dimensional vector to represent a generator combination, namely, $C=[c_1, c_2, \ldots c_i, \ldots c_n]$, where $c_i$ represents a state of the $i^{th}$ generator, and the corresponding generator does not participate in power generation when the state of the $i^{th}$ generator is 0, or has provided a certain power output to the power grid when the state of the $i^{th}$ generator is 1; define a vector $P_{G\ min}=[P_{G1\ min}, \cdots P_{Gi\ min}, \cdots P_{Gn\ min}]$ and a vector $P_{G\ max}=[P_{G1\ max}, \cdots P_{Gi\ max}, \cdots P_{Gn\ max}]$, and then obtain $$R_c^{max}(C) = P_B + \Delta P_{\Sigma} - C^T P_{Gmin}; \qquad (14)$$

and use $\Omega$ to represent a value space of C, where in this space, a quantity of states of the generator combination is $2^{n-1}$, and a purpose of the generator combination is to search for the generator state vector C in the state space $\Omega$ to maximize a peak shaving capacity, so a corresponding objective function is written as a formula $$\max R_c^{max}(C) = P_B + \Delta P_{\Sigma} - C^T P_{Gmin}. \qquad (15)$$

b4: Perform summarization according to the b3 to obtain $$\begin{cases} C^T P_{Gmin} \le P_B + \Delta P_{\Sigma} \le C^T P_{Gmax} & (a) \\ P_{Gmin} \le P_{Gi} \le P_{Gmax} & (b) \\ c_i \in [0, 1] & (c) \end{cases} \qquad (16)$$

b5: the equivalent load changes within a range of $L=[P_{min}\ P_B]$ min when the start point $P_B$ of the peak shaving of the hydropower is met, and when the equivalent load of the system continues to decrease, a limit of the negative peak shaving capacity of the system continues to decrease, for ensuring adequacy of a system capacity in the case of a minimum load, namely, $$P_{min} - C^T P_{Gmin} \geq R_{th}, \qquad (17)$$

where $R_{th}$ represents a minimum peak shaving demand based on a load and a renewable energy prediction error.

b6: Obtain a final optimization model of a thermal power generator combination based on the peak shaving of the hydropower, namely, $$\begin{cases} \max R_c^{max}(C) = P_B' - C^T P_{Gmin} & (a) \\ \text{s.t. } C^T P_{Gmin} \leq P_B + \Delta P_\Sigma \leq C^T P_{Gmax} & (b) \\ P_{Gmin} \leq P_{Gi} \leq P_{Gmax} & (c) \\ P_{min} - C^T P_{Gmin} \geq R_{th} & (d) \\ c_i \in [0, 1] & (e) \end{cases} \qquad (18)$$

The branch and bound algorithm in step s6 is as follows:

C1: Place an original problem P0 into a to-be-resolved problem set L, and set a target value $z^*=\infty$ and a solution variable $x^*=\emptyset$.

C2: Determine whether the L is null, where if the L is null, the current operation is stopped; or if the L is not null, ILP(k) is selected from the L according to a certain policy, and the ILP(k) is deleted from the L.

C3: Solve a linear relaxation problem LP(k) of the ILP(k), where if the LP(k) has no feasible solution, step C2 is performed; otherwise, $z_{LP_k}$ is set to represent an objective function value of the LP(k), wherein $x_{LP_k}$ represents the corresponding solution of the LP(k).

C4: If $z_{LP_k} \geq z^*$, perform step C2, where if $x_{LP_k}$ does not meet an integer constraint, step C3 is performed; otherwise, $z^*=z_{LP_k}$ and $z^*=x_{LP_k}$ are set, and step C2 is performed.

The present disclosure provides a coordinated optimization peak shaving method for a plurality of power supplies based on fluctuation characteristics of renewable energy. A working principle of the coordinated optimization peak shaving method is as follows: determining a weekly generated electricity quantity of hydropower based on an available capacity and a storage capacity of an electricity quantity; predicting a renewable energy power generation curve and a load curve of a system weekly; determining a start point of peak shaving of the hydropower based on an external transmission curve, the renewable energy power generation curve, and the load curve of the system and a generating capacity of the hydropower; determining a weekly peak shaving demand of the system, and establishing an optimization model with a maximum peak shaving demand; calculating a system optimization model based on a branch and bound algorithm, and determining a unit combination scheme of the system; and finally calculating a peak shaving capability of the system and a margin of the peak shaving capability in a peak period of wind power generation. In conclusion, the present disclosure proposes a reasonable arrangement for peak shaving, so as to resolve an accommodation problem caused by large-scale access of renewable energy. Further, in order to meet a peak shaving demand for accommodating the renewable energy, an optimization model of a startup and shutdown combination of a thermal power generator is proposed to meet a peak shaving demand of the system. A weekly startup mode of the thermal power generator can be determined by solving and establishing the model, which can ensure a peak shaving capability of the system while avoiding frequent startup and shutdown of the thermal power generator.

It should be understood that in the description of the present disclosure, the indicated orientation or position relationships are based on the embodiments. They are merely intended to facilitate or simplify description of the present disclosure, rather than to indicate or imply that the mentioned apparatus or component must have a specific orientation and must be constructed and operated in a specific orientation. Therefore, these terms should not be construed as a limitation to the present disclosure.

In the present disclosure, unless otherwise clearly specified, for example, a connection may be a fixed connection, a removable connection, or an integral connection; may be a mechanical connection or an electrical connection; may be a direct connection or an indirect connection by using an intermediate medium; or may be intercommunication between two components or interaction between two components. Unless otherwise clearly specified, a person of ordinary skill in the art can understand a specific meaning of the term in the present disclosure based on a specific situation.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

The invention claimed is:

1. A coordinated optimization peak shaving method for a plurality of power supplies based on fluctuation characteristics of renewable energy, comprising the following steps:

s1: determining a weekly generated electricity quantity of hydropower based on an available capacity and a storage capacity of an electricity quantity;

s2: predicting a renewable energy power generation curve and a load curve of a system weekly;

s3: determining a start point of peak shaving of the hydropower based on an external transmission curve, the renewable energy power generation curve, and the load curve of the system and a generating capacity of the hydropower;

s4: determining a weekly peak shaving demand of the system;

s5: establishing an optimization model with a maximum peak shaving demand;

s6: calculating a system optimization model based on a branch and bound algorithm to determine a unit combination scheme of the system; and s7: calculating a peak shaving capability of the system and a margin of the peak shaving capability in a peak period of wind power generation, and controlling a thermal power generator to start up or shut down based on the unit combination scheme of the system.

2. The coordinated optimization peak shaving method for a plurality of power supplies based on fluctuation characteristics of renewable energy according to claim 1, wherein the determining a start point of peak shaving of the hydropower in step s3 comprises the following steps:

a1: determining a basic operating power $P_B$ of the hydropower, and determining, based on a capacity limit of a reservoir, that a limit of a planned weekly electricity quantity generated is $[E_{min}, E_{max}]$, wherein a difference between $E_{min}$ and $E_{max}$ is controlled to be between 2% and 5%; when the $P_B$ is calculated, a generated electricity quantity of the hydropower is calculated according to a formula $E_H=(E_{min}+E_{max})/2$ (1); a weekly load curve in a regional power grid is denoted as $P_l(t)$, an external transmission power curve is denoted as $P_T(t)$, renewable energy power generation is denoted as $P_R(t)$; and in this case, an equivalent load of the system is:

$$P_l^E(t) = P_l(t) + P_T(t) - P_R(t), \tag{2}$$

the generated electricity quantity of the hydropower meets:

$$\int_0^T [P_l^E(t) - P_B] dt = E_H, \tag{3}$$

and a following constraint is met:

$$\max\{P_l^E(t)\} - P_B \le R_H^{max}; \tag{4}$$

a2: performing initialization based on historical data and operating experience to make $$P_B = P_B^0, $$

and setting an error parameter $\varepsilon$;

a3: testing whether an inequality $$\max\{P_l^E(t)\} - P_B \le R_H^{max} \tag{4}$$

true, and if the inequality does not hold true, increasing $P_B$ until the inequality holds true;

a4: calculating an integral $$\int_0^T [P_l^F(t) - P_B] dt$$

according to a formula $$\int_0^T [P_l^E(t) - P_B] dt = E_H; \text{ and if} \tag{3}$$

$$\left| \int_0^T [P_l^E(t) - P_B] dt - E_H \right| > \varepsilon, \text{ and} \tag{5}$$

$$\int_0^T [P_l^E(t) - P_B] dt > E_H, \tag{6}$$

setting $P_B=P_B-\Delta P$ (7), and on the contrary, setting $P_B=P_B+\Delta P$ (8); and a5: repeating step a4 until $$\left| \int_0^T [P_l^E(t) - P_B] dt - E_H \right| \le \varepsilon, \tag{9}$$

and recording a current value of $P_B$.

3. The coordinated optimization peak shaving method for a plurality of power supplies based on fluctuation characteristics of renewable energy according to claim 1, wherein an equation condition of an active power balance satisfied by active power outputs, loads, and active power losses of all generators in a power grid at any time for the peak shaving demand in step s4 is as follows:

$$\sum_{i=1}^n P_{Gi} - \sum_{i=1}^m P_{Li} - \Delta P_\Sigma = 0 \tag{10}$$

wherein when a startup mode of thermal power is determined, in order to ensure a maximum power output of the thermal power and reliable power supply of a load when the hydropower is not started, a power $P_B$ of the start point of the peak shaving of the hydropower is used to replace a total equivalent load $$\sum_{i=1}^m P_{Li},$$

wherein i represents a total quantity of generators, m represents a total quantity of loads, and $P_{Li}$ represents an active power of an $i^{th}$ load, $$\sum_{i=1}^n P_{Gi}$$

represents a sum of power outputs of all the generators in the power grid, and a power output $P_{Gi}$ of each generator meets upper and lower limit constraints shown in an equation (11):

$$P_{Gi}^{min} \le P_{Gi} \le P_{Gi}^{max} \tag{11}$$

wherein $\Delta P_\Sigma$ represents an active power loss of the power grid; and $$P_{Gi}^{min}$$

and $$P_{Gi}^{max}$$

respectively represent lower and upper limits of a power output of an $i^{th}$ generator;

when an equivalent load of the system is reduced from $P_B$ to $P_{min}$ in a peak period of renewable energy power generation, the active power balance is written as follows:

$$\sum_{i=1}^{n} P'_{Gi} - (P_B - \Delta P_L) - \Delta P_\Sigma = 0 \qquad (12)$$

wherein $\Delta P_L$ represents a variable of the equivalent load, which is a positive value; and $P_{Gi}'$ represents a changed power of the $i^{th}$ generator;

a following formula is obtained by subtracting the equation (10) from an equation (12):

$$\sum_{i=1}^{n} P'_{Gi} - \sum_{i=1}^{n} P_{Gi} = -\Delta P_L = -R_c; \qquad (13)$$

and in this case, $\Delta P_L$ represents the variable of the equivalent load, and $-\Delta P_L$ is always a negative value; $-R_c$ is defined as a negative peak shaving capacity of a conventional generator; and in the formula (13), a negative peak shaving capability of the conventional generator is a capability of the conventional generator in reducing an active power output when an equivalent active load in the power grid decreases from the $P_B$ to the $P_{min}$, wherein the negative peak shaving capacity is equal to a difference between an output after adjustment and an output before the adjustment, which is always negative.

4. The coordinated optimization peak shaving method for a plurality of power supplies based on fluctuation characteristics of renewable energy according to claim 1, wherein the establishing an optimization model with a maximum peak shaving demand in step s5 comprises the following steps:

b1: setting a maximum negative peak shaving capacity of a thermal power generator, wherein the maximum negative peak shaving capacity of the thermal power generator depends on a given lower limit parameter $$\sum_{i=1}^{n\Sigma} P'_{Gimin}$$

of a power output of a generator combination; and in a power grid, there are a plurality of generator combinations meeting a given load requirement, and different generator combinations have different output lower limits;

b2: finding, through optimization, a minimum value of the $$\sum_{i=1}^{n\Sigma} P'_{Gimin}$$

meeting a load demand, so as to provide a negative peak shaving capacity and increase an accommodation proportion of renewable energy;

b3: determining that there are N generators participating in the peak shaving in a regional power grid, and a power output of an $i^{th}$ generator is $P_{Gi}$ whose value range is defined as $[P_{G\ min}\ P_{G\ max}]$, wherein $P_{G\ min}$ represents a lower limit of the power output of the $i^{th}$ generator, and $P_{G\ max}$ represents an upper limit of the power output of the $i^{th}$ generator; defining an N-dimensional vector to represent a generator combination, namely, $C=[c_1, c_2, \ldots c_i, \ldots c_n]$, wherein $C_i$ represents a state of the $i^{th}$ generator, and the corresponding generator does not participate in power generation when the state of the $i^{th}$ generator is 0, or has provided a certain power output to the power grid when the state of the $i^{th}$ generator is 1; defining a vector $P_{G\ min}=[P_{G1\ min}, \ldots P_{Gi\ min}, \ldots P_{Gn\ min}]$ and a vector $P_{G\ max}=[P_{G1\ max}, \ldots P_{Gi\ max}, \ldots P_{Gn\ max}]$ and then obtaining $$R_c^{max}(C) = P_B + \Delta P_\Sigma - C^T P_{Gmin}; \qquad (14)$$

and using $\Omega$ to represent a value space of C, wherein in this space, a quantity of states of the generator combination is $2^{n-1}$, and a purpose of the generator combination is to search for the generator state vector C in the state space $\Omega$ to maximize a peak shaving capacity, so a corresponding objective function is written as a formula $$\max R_c^{max}(C) = P_B + \Delta P_\Sigma - C^T P_{Gmin}; \qquad (15)$$

b4: performing summarization according to step b3 to obtain $$\begin{cases} C^T P_{Gmin} \leq P_B + \Delta P_\Sigma \leq C^T P_{Gmax} & (a) \\ P_{Gmin} \leq P_{Gi} \leq P_{Gmax} & (b); \\ c_i \in [0, 1] & (c) \end{cases} \qquad (16)$$

b5: the equivalent load changes within a range of $L=[P_{min}\ P_B]$ when the start point $\underline{P_B}$ of the peak shaving of the hydropower is met, and when the equivalent load of the system continues to decrease, a limit of the negative peak shaving capacity of the system continues to decrease, for ensuring adequacy of a system capacity in the case of a minimum load, namely, $P_{min}-C^T P_{G\ min} \geq R_{th}$ (17), wherein $R_{th}$ represents a minimum peak shaving demand based on a load and a renewable energy prediction error; and b6: obtaining a final optimization model of a thermal power generator combination based on the peak shaving of the hydropower, namely, $$\begin{cases} \max R_c^{max}(C) = P_B' - C^T P_{Gmin} & (a) \\ \text{s.t.}\ C^T P_{Gmin} \leq P_B + \Delta P_\Sigma \leq C^T P_{Gmax} & (b) \\ P_{Gmin} \leq P_{Gi} \leq P_{Gmax} & (c) \cdot \\ P_{min} - C^T P_{Gmin} \geq R_{th} & (d) \\ c_i \in [0, 1] & (e) \end{cases} \qquad (18)$$

5. The coordinated optimization peak shaving method for a plurality of power supplies based on fluctuation characteristics of renewable energy according to claim 1, wherein the branch and bound algorithm in step s6 is as follows:

C1: placing an original problem P0 into a to-be-resolved problem set L, and setting a target value $z^*=\infty$ and a solution variable $x^*=\emptyset$;

C2: determining whether the L is null, wherein if the L is null, the current operation is stopped; or if the L is not null, ILP(k) is selected from the L according to a certain policy, and the ILP(k) is deleted from the L;

C3: solving a linear relaxation problem LP(k) of the ILP(k), wherein if the LP(k) has no feasible solution, step C2 is performed; otherwise, $z_{LP_k}$ is set to represent an objective function value of the LP(k), wherein $x_{LP_k}$ represents the corresponding solution of the LP(k); and C4: if $z_{LP_k} \geq z^*$, performing step C2, wherein if $x_{LP_k}$ does not meet an integer constraint, step C3 is performed; otherwise, $z^* = z_{LP_k}$ and $x^* = x_{LP_k}$ are set, and step C2 is performed.

* * * * *